United States Patent [19]

Jardine

[11] Patent Number: 5,750,272
[45] Date of Patent: May 12, 1998

[54] ACTIVE AND ADAPTIVE DAMPING DEVICES FOR SHOCK AND NOISE SUPPRESSION

[75] Inventor: A. Peter Jardine, Setauket, N.Y.

[73] Assignee: The Research Foundation of State University of New York, Albany, N.Y.

[21] Appl. No.: 386,454

[22] Filed: Feb. 10, 1995

[51] Int. Cl.$^6$ .................. B32B 15/04; H04R 17/00; H01L 41/053

[52] U.S. Cl. .................. 428/686; 428/660; 428/668; 428/680; 367/157; 367/162; 367/164; 310/334

[58] Field of Search .................. 364/157, 162, 364/164; 428/645, 660, 680, 686; 310/334

[56] References Cited

U.S. PATENT DOCUMENTS

| | | | |
|---|---|---|---|
| 3,684,351 | 8/1972 | Kumada | 359/250 |
| 3,701,585 | 10/1972 | Barkley et al. | 359/251 |
| 3,733,590 | 5/1973 | Kaufman | 365/117 |
| 3,773,898 | 11/1973 | Keiichiro et al. | 423/263 |
| 3,782,806 | 1/1974 | Barkley et al. | 359/320 |
| 3,799,648 | 3/1974 | Flippen | 359/251 |
| 3,851,192 | 11/1974 | Flippen et al. | 310/319 |
| 4,085,576 | 4/1978 | Deverin | 368/82 |
| 4,401,956 | 8/1983 | Joshi | 333/152 |
| 4,472,113 | 9/1984 | Rogen | 417/321 |
| 4,704,306 | 11/1987 | Nakamura | 427/100 |
| 4,733,121 | 3/1988 | Hebert | 310/311 |
| 4,841,685 | 6/1989 | Masri et al. | 52/1 |
| 4,929,874 | 5/1990 | Mizuono et al. | 318/128 |
| 5,022,272 | 6/1991 | Bronowicki et al. | 73/772 |
| 5,059,850 | 10/1991 | Yoshimura et al. | 310/328 |
| 5,061,914 | 10/1991 | Busch et al. | 337/140 |
| 5,116,643 | 5/1992 | Miller et al. | 427/126.3 |
| 5,155,709 | 10/1992 | Flanagan et al. | 367/174 |
| 5,159,224 | 10/1992 | Kramer et al. | 310/223 |
| 5,168,673 | 12/1992 | Nemir et al. | 52/1 |
| 5,184,319 | 2/1993 | Kramer | 368/806 |
| 5,198,269 | 3/1993 | Swartz et al. | 427/226 |
| 5,203,438 | 4/1993 | Ide | 192/107 C |
| 5,209,119 | 5/1993 | Polla et al. | 73/723 |
| 5,209,568 | 5/1993 | Buffard et al. | 374/49 |
| 5,351,219 | 9/1994 | Adachi et al. | 367/157 |

OTHER PUBLICATIONS

Jardine, A.P. et al., "Cavitation–Erosion Resistance of Thick–Film Thermally Sprayed NiTi," M.R.S. Symp. Proc., vol. 213, p. 815, (1991).

Jardine, A.P., "Materials Development of Thin Film TiNi Ferroelastic–Ferroelectric Heterostructures," M.R.S. Symp. Proc., vol. 276, p. 31, (1992).

Jardine, A.P., "Adaptive Damping in Shape Memory TiNi During Cavitation," M.R.S. Symp. Proc., vol. 276, p. 178, (1992).

Truskinovsky, L., "Inertial Effects in the Dynamics of Martensitic Phase Boundaries," M.R.S. Symp. Proc., vol. 246, p. 104, (1992).

Jardine, A., "Synthesis of Thin–Film Ferroelectrics on Si and Shape Memory Effect TiNi Substrates," Smart Mater. Structure, vol. 3, pp. 140–146, (1994).

Jardine, A.P., et al., "Thin Film Multilayers of TiNi/TiO$_2$/PZT: Mechanical and Ferroelectrical Characterization," Smart Materials and Structures 1994: Smart Materials, V.J. Varadan, Editor., Proc., SPIE vol. 2189, p. 37, (1994).

Mercado, P.G., et al., "Smart Thin Film TiNi/Piezoelectric Heterostructures," 50th Annual Conference of the American Vacuum Society, Denver Colorado, (1994).

Mercado, P.G., et al., "Thin Film Multilayers of TiNi/TiO$_2$/PZT: Material Fabrication," SPIE Proceedings: Smart Materials, Orlando, Florida Conference, vol. 2189, p. 26, (1994).

Hey, J.C., et al., "Shape Memory TiNi Synthesis from Elemental Powders," Materials Science and Engineering, A188, pp. 291–300, (1994).

*Primary Examiner*—Tae Yoon
*Attorney, Agent, or Firm*—Hoffmann & Baron

[57] ABSTRACT

Active and adaptive vibration damping devices are provided. The damping devices include heterostructures having a layer of ferroelastic or SME material coupled with a first and second layer of ferroelectric material having a layer of dielectric material therebetween. Methods of making the active and adaptive vibration damping devices are also provided.

34 Claims, 9 Drawing Sheets

MANUFACTURING STEPS TO CREATE HETEROSTRUCTURE

ACTIVE AND ADAPTIVE DAMPING DEVICES FOR SHOCK AND NOISE SUPPRESSION

BACKGROUND OF INVENTION

The present invention relates to active and adaptive vibration damping devices useful for shock noise suppression. More specifically, the damping devices are panels made from ferroelastic/ferroelectric heterostructures having both active and adaptive properties. Methods of making the heterostructures of the present invention are also provided.

Suppression of shock waves resulting from air blasts and explosives has become increasingly important for the protection of strategic buildings, ordinance storage and airplane security.

Attempts have been made in the past to provide structures and techniques to suppress shock waves generated by air blasts or explosives. In certain applications, building structures rely on simply adding armour to existing structures making these structures both heavy and expensive. Moreover, adding heavy armour is difficult for airplane security due to resulting weight penalties.

Other traditional approaches in the area of vibration control of structures include detection by sensors and application of out-of-phase forces. For example, U.S. Pat. No. 4,841,685 to Masri, et al., entitled "Controllable Damper"; U.S. Pat. No. 4,429,496 to Masri, entitled "Method and Apparatus for Active Control of Flexible Structures"; and U.S. Pat. No. 4,929,874 to Mizuno, et al., entitled "Vibration Control System", are all representative of this approach. Such systems require tremendous energy, are subject to overcorrection and modal spillover, and are basically limited to correction of the swaying mode of vibration.

U.S. Pat. No. 5,168,673 to Nemir, et al., discloses methods and apparati for vibration energy removal in a structural system. Sensors are used in the structure to determine the vibration energy content of the structure and to detect whether controllable springs are in tension, compression, or are relaxed. Relaxed springs are provided to be stiffened or relaxed so that a transfer of energy from low vibration modes to higher modes occurs resulting in a dissipation of system energy. The technique utilizes piezoelectric strain gauges which are used to monitor the states of tension, compression and relaxation of each beam. The energy is transferred to higher vibration modes by use of a clamping or releasing pinned connections existing between columns and beams of certain structure. The clamping means may be made of an adaptive memory alloy actuators such as TiNi or Nitinol. The method disclosed in the '673 reference may also use shape memory alloy actuators. The method uses a system of connecting or releasing cross braces used for energy transfer into higher modes of vibration resulting in quicker energy dissipation and reduced amplitude of vibration. The method disclosed in Nemir, et al., relies on a very complex system of springs, strain gauges, releasing and connecting cross braces and as a result is impractical and expensive.

Accordingly, there is still a need in the art of shock and noise suppression for structures which are light, inexpensive and can be used to protect strategic buildings and/or equipment without adding significant weight and which are relatively simple to use and inexpensive to manufacture.

It is, therefore, an object of the present invention to provide new heterostructures which are light, inexpensive, exhibit superior sensor-actuator characteristics and can be used as damping devices, preferably panels, for shock and noise suppression.

SUMMARY OF INVENTION

The present invention, which addresses the needs of the prior art, provide active and adaptive vibration damping devices which are useful for mechanical and acoustic wave suppression.

More specifically, it has now been found that by coupling a layer of ferroelastic material or Shape Memory Effect (SME) material, which is positioned to receive a vibration wave, with a first and second layers of ferroelastic materials having a layer of dielectric material sandwiched therebetween, damping devices are provided which are light, inexpensive and very effective in suppressing shock and acoustic waves.

In the present invention, the first layer of ferroelectric material functions as a sensor and the second layer of ferroelectric material functions as an actuator. As a result, the first layer of ferroelectric material is relatively thin from about 0.5 µm to about 100 µm, sufficient to sense a force and to generate an appropriate voltage. In contrast, in order to generate a counteracting force onto the heterostructure, the second layer of ferroelectric material is much thicker, from about 5 µm to about 1000 mils.

The heterostructures of the present invention utilize the unique properties of both ferroelastic and ferroelectric materials. Ferroelastic and SME materials include AuCd, AgCd, InTl, Ti-based SME alloys, FeMnSi and FePt. Ferroelectric materials, such as perovskite based ceramics, exhibit piezoelectric properties which generate a voltage when a mechanical force is applied and vice versa. In order to control the resistance and capacitance of the resulting circuit, a layer of dielectric material is disposed intermediate the first and second layer of ferroelectric material. The damping devices of the present invention can optionally include a buffer layer intermediate the layer of dielectric material and the second layer of ferroelectric material.

Methods of making the damping devices of the present invention are also provided. For example, powder metallurgy is used to manufacture ferroelastic materials used in the present invention. Sol gel technology is used to deposit the films of ferroelectric material onto the films of ferroelastic material.

As a result of the active and adaptive vibration damping devices provided by the present invention, when a blast wave hits the ferroelastic layer an isothermal martensitic-austenitic transformation occurs, the effect of which is to convert some of the elastic shock energy into heat. When the stress of the blast wave is removed, the material reverts to its equilibrium state with the generation of heat. Continued propagation of the damped shock wave through the first sensor layer of ferroelectric material produces a voltage along the layer of dielectric material which is used to drive the second layer of ferroelectric material to generate an out-of-phase stress field in the heterostructure of the present invention which further attenuates the shock wave. The layer of dielectric material acts as a capacitance. As a result, the actuator layer of ferroelectric material utilizes the converse piezoelectric effect to contract thereby generating an extensive stress wave in the layer of ferroelastic material which is lagging in time, thus providing destructive interference with the initial compressive shock wave.

In addition, the novel heterostructures of the present invention find application as "smart" active damping panels used to suppress shock waves generated by air blasts both in open and confined spaces, such as those generated by small explosives in the protection of ordinance storage, airline security and strategic buildings. "Smart" air-blast mitigation is accomplished by converting shock energy into heat, as well as generating stresses within the heterostructures of the present invention which actively cancel the propagating shock wave within the material.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

Figure 1A:
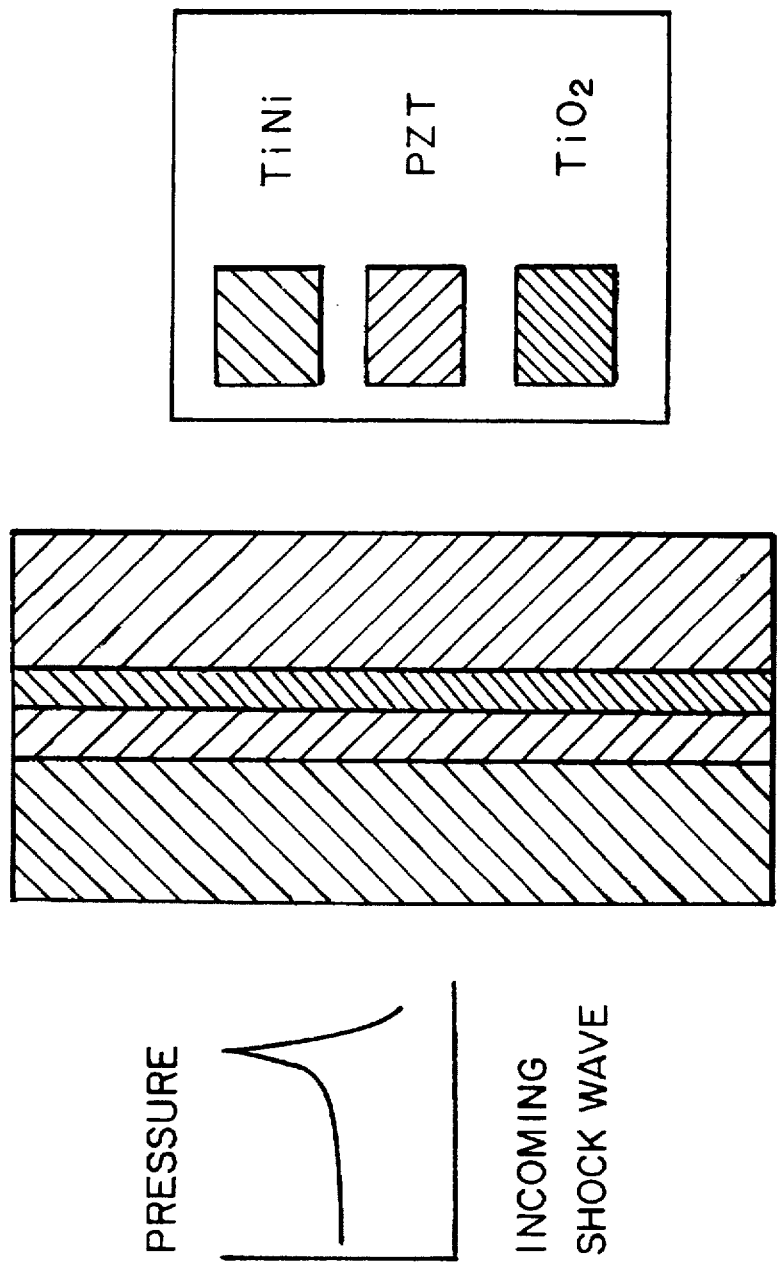
FIG. 1a is a schematic of a "smart" ferroelastic-ferroelectric active damping structure of the present invention.

Certain combinations of ferroelectric and ferroelastic materials provide "smart" sensor-actuator structures which can be advantageously used for shock and noise suppression applications. A material is defined as being "smart" or "intelligent" if it has both sensing and actuating capability coupled by an innate control mechanism. A class of smart materials can be fabricated by combining shape memory alloys (SMA) or ferroelastic materials with ferroelectric ceramics. These hybrid structures couple the broad mechanical stress-strain hysteresis properties of SMA with the mechanical-electrical relationship associated with ferroelectric ceramics such as piezoelectric materials. In particular, these heterostructures are effective for active suppression of large shock and acoustic waves.

Ferroelastic materials are examples of active and adaptive materials. The most important properties of ferroelastic materials stem from their dramatic, temperature dependent mechanical properties called shape memory effect ("SME").

As used in the present invention ferroelastic materials means all ferroelastic and/or materials exhibiting SME properties, hereafter referred to interchangeably as ferroelastic/SME or ferroelastic materials. SME is due to a first order martensitic phase transformation from a high symmetry and high temperature austenitic B2 phase to a low symmetry and low temperature martensitic B19 phase. At the low temperature phase, a shape memory alloy is easily twinned into many crystallographic twin variants. Crystallographic twins grow at the expense of other variants with an applied stress. Macroscopically, the martensitic material is easily deformed through the growth of twin variants, which can accommodate seemingly plastic strains (up to 8% for TiNi) which are recoverable upon heating. The material is recoverable upon heating into its high temperature phase or austenitic phase, hence the term SME. There are many alloys that exhibit SME, including AuCd, AgCd, InTl, Cu—Al—Zn, Cu—Al—Ni; and Ti-based alloys, such as: TiAu, TiPt, TiNb, TiNi.

Ferroelectric materials have piezoelectric properties, namely, the ability to generate voltage when a mechanical force is applied and vice versa. The piezoelectric effect is the linear interaction between the electrical and mechanical systems of a material. An applied mechanical stress on a crystal produces a proportional electric field known as the direct piezoelectric effect. In the converse effect, an electrical field produces strain on the crystal. There are a large number of ferroelectric materials or ceramics.

Ferroelectric materials useful for the present invention include all ceramics exhibiting piezoelectric effect. Examples include ceramic materials based on the lead titanate family including dopants, the lead zirconate titanate family including dopants, lead lanthanum zirconate (PLZT), strontium titanate including dopants, barium titanate including dopants, lead magnesium niobate (PMN) including dopants. Ferroelectric materials useful for the present invention also include perovskite based ceramics, tungsten-based ceramics, lithium niobate, lithium tantalate based materials and polymeric type materials such as polyvinyldifluoride.

Lead titanate (PbTiO$_3$), lead zirconate titanate (Pb)(Zr$_x$Ti$_{1-x}$)O$_3$, ("PZT"), lead lanthanum zirconate titanate ("PLZT"), strontium titanate (SrTiO$_3$) and barium titanate (BaTiO$_3$) are specific examples of ferroelectric ceramics useful for the present invention.

Useful dopants for the ferroelectric layers of the present invention include Nb, Sn, La, Ce, Mn, Fe, Co, W, Zn, Mg, Sb, Ta, Cd, Y, Ni, Li, Te, Cu, In, Bi, Al, Th and mixtures thereof.

PZT exhibits a large piezoelectric effect, and as a result it is a preferred ferroelectric material for the heterostructures of the present invention. PZT is an attractive material for both force sensing and actuation.

Ferroelectric materials can be made by thin-film deposition techniques including laser ablation, RF and DC magnetron sputtering and sol-gel processing. Sol-gel fabrication is a preferred method of making the ferroelectric materials useful for the present invention because it is relatively inexpensive and allows a particularly good control of composition. For thick sensor/actuator combinations using ferroelectric ceramics, conventional ceramic powder processing and sintering followed by lapping will be more effective in generating these materials. If non-ceramic ferroelectric materials are used, such as polymeric sensors, i.e., polyvinyldifluoride (PVdF), then conventional extrusion and rolling of the polymer would be the preferred method.

Coupling ferroelastic SMA and ferroelectric ceramics provides hybrid structures which utilize the unique properties of both materials. Ferroelectric ceramics are very sensitive to applied stresses through the piezoelectric effect and have fast response times accompanied by very small displacements due to the small strain magnitude. In contrast, ferroelastic materials have larger displacements and are able to drive larger loads. The cycling time of ferroelastic materials is much slower, however, because both heating and cooling times depend on heat transfer out of the material. In particular, on cooling, the heat dissipation is purely passive. For complete cooling, both the latent heat of transformation and the enthalpy generated on heating must be dissipated.

The heterostructures of the present invention include at least one layer of ferroelastic material coupled with a first and second layer of a ferroelectric material wherein a layer of a dielectric material or a capacitor such as titanium oxide ($TiO_2$) is sandwiched between the two layers of ferroelectric material. In this manner, advantages intrinsic in both materials can be utilized to produce functionally superior sensor-actuator heterostructures. When used in the damping panels provided by the present invention, the heterostructures of the present invention provide smart active damping of mechanical and acoustic vibrations.

The dielectric material used as a controlling layer in the structures of the present invention is required to generate the capacitance and resistance required for the resulting circuit. As used in the present invention, dielectric material refers to a material which is an electric insulator in which an electrical field can be sustained with a minimum dissipation of power.

$TiO_2$ is a preferred dielectric material because it can be easily grown onto PZT disks by sol-gel deposition followed by annealing. While $TiO_2$ is a preferred dielectric material useful in the manufacture of the heterostructures of the present invention, other dielectric materials including dopants are also useful, depending upon the application for which the damping panels of the present invention are used. Other dielectric materials useful for the present invention include NiO, $SiO_2$, TiO, $Ti_3O_4$, PbO, $ZrO_2$ and polymeric dielectric materials. Useful dopants for the dielectric material layer are many of the same as those described above for ferroelectric layers. The choice of dielectric material and its thickness are within the skill of the average artisan.

FIG. 1a illustrates the "smart" ferroelectric/ferroelastic active damping structure of the present invention. The layers shown in FIG. 1a can be arranged in a repeating pattern depending upon the application for which the damping device is used.

The manner in which active damping by a ferroelastic/ferroelectric structure functions is shown in FIG. 1a. An approaching stress wave propagates into the TiNi outer layer, an isothermal martensitic phase transformation is produced in which some of the mechanical energy converts into heat. The TiNi layer is designed to absorb most of the high energy waves. When the stress for the blast wave is removed, the ferroelastic material reverts to its equilibrium state with the generation of heat. Acoustic waves which are not damped by the TiNi layer continue to propagate and strain the first PZT ferroelectric layer. If the wave continues to propagate, it produces a voltage across the first ferroelectric layer which can be used to produce an out-of-phase stress wave by the second ferroelectric layer which in turn attenuates any remaining stress wave. By varying the thickness of the $TiO_2$ layer between the ferroelectric layers (PZT), it is possible to control the resistance and capacitance of the resulting circuit. As a result of the heterostructures of the present invention, the actuator layer of ferroelectric material utilizes the piezoelectric effect to contract thereby generating an extensive stress wave in the layer of ferroelastic material which is lagging in time thus providing a destructive interference with the initial compressive shock wave.

Figure 1B:
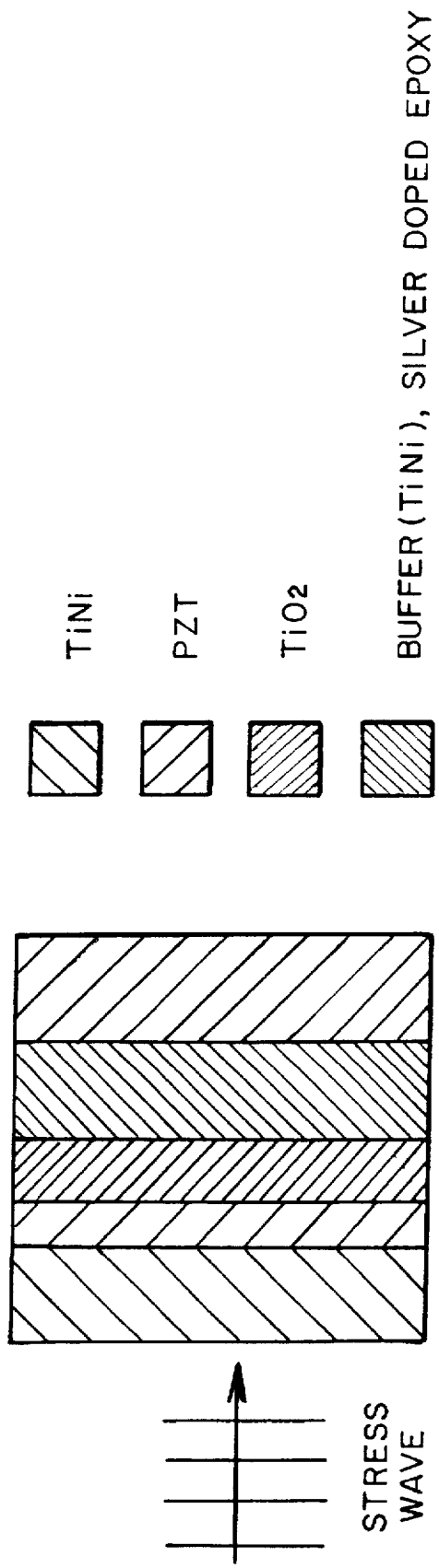
FIG. 1b is a schematic of a preferred embodiment of a heterostructure provided by the present invention.

In a preferred embodiment as shown in FIG. 1b, a mechanical metallic impedance buffer made of aluminum, titanium or Nitinol can be coupled to the titanium oxide layer to provide time for the counter-stress actuation to occur. In another preferred embodiment the buffer layer can be a layer of silver doped epoxy or conductive polyurethane to increase the damping of the low frequency high amplitude vibrations. The buffer layer has a thickness from about 5 μm to about 1000 mils.

When the damping panels of the present invention are utilized in small structures, then the buffer layer between the $TiO_2$ layer and the thicker PZT layer can be omitted.

In yet another preferred embodiment the layer of ferroelastic material which initially receives the vibration wave is covered with a thermoreflective layer of aluminum or a similar thermal barrier material which generates high thermal reflectivity and low thermal conductivity. Other materials useful as thermoreflective barrier material include nickel, copper, titanium and aluminized MYLAR®, wherein MYLAR® means a polyester film used for electrical, industrial and packaging purposes. The thermoreflective barrier layer is from about 50 nm to about 20μ in thickness. For example, the reflective layer of aluminum protects the vibration damping devices of the present invention from elevated thermal energy which is released as a consequence of an explosion blast wave.

In the heterostructure of the present invention, the ferroelastic/SME layer is from about 1 μm to about 1000 mils, the thickness of the first ferroelectric layer which is coupled to the ferroelastic layer is from about 0.5 μm to about 100 μm, the thickness of the second ferroelectric layer which is coupled to the $TiO_2$ or control buffer layer is from about 5 μm to about 1000 mils. The thickness of the layer of dielectric material may vary from about 0.1 μm to about 10 μm mils. For all the foregoing layers the preferred thickness varies with the application, the exact dimensions being within the skill of the average artisan.

Figure 2:
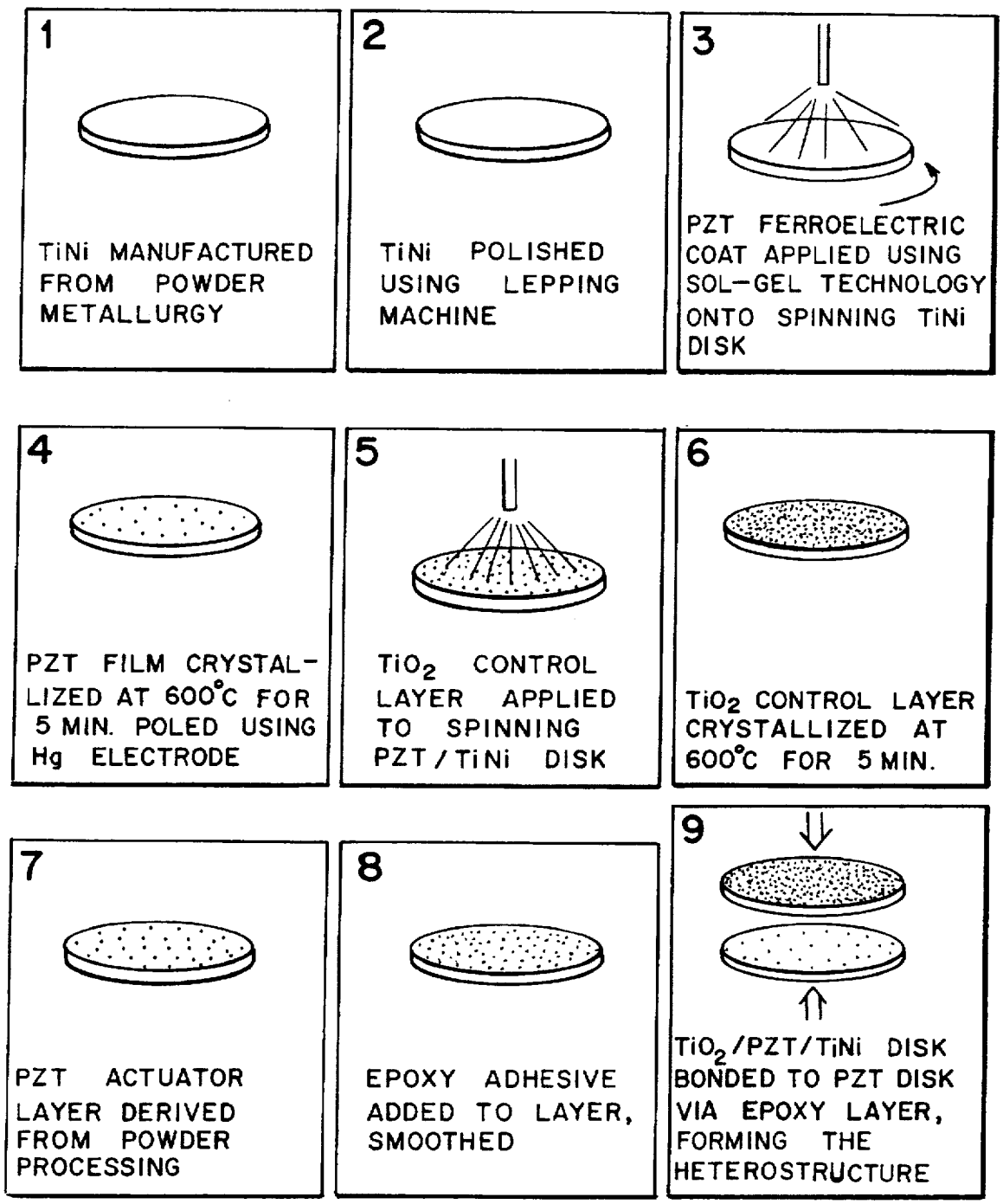
FIG. 2 is a sequence of schematics which show steps in the manufacturing of TiNi/PZT/TiO$_2$/epoxy/PZT according to one embodiment of the present invention.

The present invention also provides processes for the manufacture of the ferroelastic/ferroelectric heterostructures of the present invention as shown in FIG. 2. TiNi can be manufactured by powder metallurgy from nickel and titanium powders. A PZT sol is then applied onto a spinning TiNi disk by sol-gel technology followed by annealing from about 570° C. to about 640° C. for a period which can vary from about 1 minute to about 30 minutes. A $TiO_2$ control layer is applied to the TiNi/PZT structure also by sol-gel technology followed by annealing under conditions similar to those required for the formation of PZT/TiNi structures. The $TiO_2$/PZT/TiNi disk is then bonded to a thicker PZT disk by using an adhesive such as silver doped epoxy thus forming the preferred heterostructure of the present invention.

An important consideration in fabricating the active and adaptive damping panels of the present invention is the ability to generate the appropriate phases for each layer of the heterostructures of the present invention while minimizing unwanted mutual chemical interactions. The amorphous crystalline transformation for TiNi occurs at 490°–520° C. For temperatures above 540° C., formation of $Ti_3Ni_4$ and $Ti_{11}Ni_{14}$ precipitates have been observed which can be detrimental to SME characteristics. Decomposition of the ferroelastic phase of TiNi into $TiNi_3$ has also been observed to begin above annealing temperatures of 450° C. with further decomposition at higher temperatures. In contrast, annealing temperatures to transform amorphous ceramics fabricated by sol gel to the ferroelectric perovskite phase range from 500° to 800° C. depending on the type of ferroelectric material and at times the type of substrate.

The focus of the examples set forth below has been to provide novel methods for fabricating the type of heterostructures of the present invention. Conditions required to provide the optimum phases for each layer of the heterostructures of the present invention have also been investigated.

EXAMPLES

The following examples have been carried out to show the preparation of the heterostructures of the present invention and to characterize the mechanical and ferroelectric properties which enable the heterostructures of the present invention to act as excellent damping panels for shock and noise suppression. These examples also serve to provide further appreciation of the invention but are not meant in any way to restrict the effective scope of the invention.

Example 1

In this example a multilayer heterostructure as shown in FIG. 1 is prepared.

Preparation of PZT Solution

Figure 3:
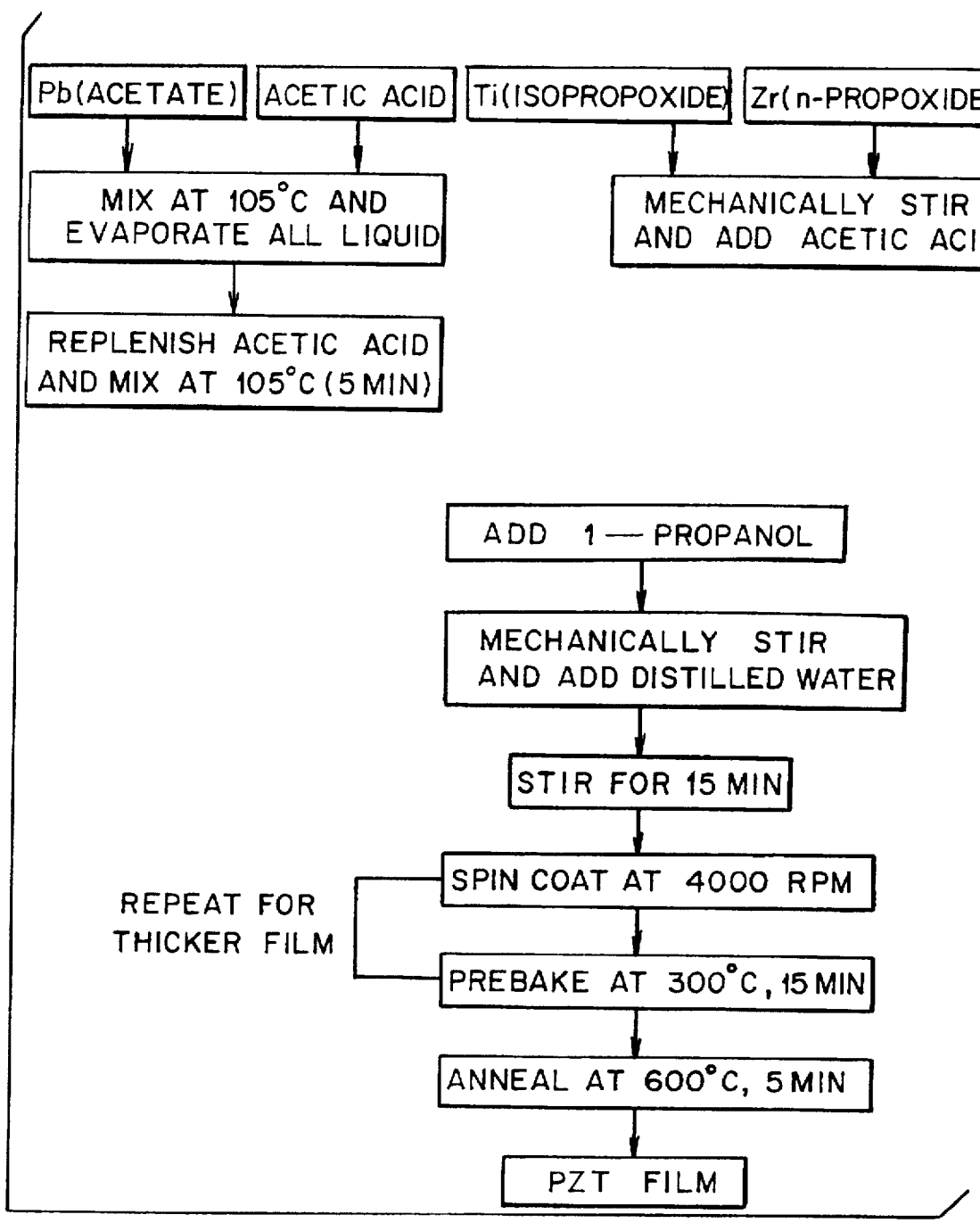
FIG. 3 is a flow diagram which summarizes the steps for sol-gel preparation of a layer of ferroelectric material coupled to a layer of ferroelastic material (PZT film on TiNi) according to one embodiment of the present invention.

The complex alkoxide solution was prepared by mixing lead acetate, zirconium n-propoxide and titanium isopropoxide metal alkoxides dissolved in acetic acid and 1-propanol alcohol. The PZT sol was prepared by dissolving 8 gm of lead acetate in 4 ml of acetic acid and heating to 105° C. until a solid formed. After evaporation of all liquid, 4 ml of acetic acid was added and the resulting mixture was stirred for 15 minutes. Ti-isopropoxide was combined with Zr n-propoxide to produce a ceramic wherein the atomic percentages of TiZr was about 47 to 48 atomic % Zr and from about 53 to 52 atomic % Ti. The lead precursor was then added to the Zr/Ti precursor while being mechanically stirred. 40 ml of 1-propanol was added to the Pb/Zr/Ti precursor, followed by the addition of 1.0 ml of water to hydrolyze the solution. The general procedure is summarized in FIG. 3. The PZT sol was filtered through a 0.22 µm filter before deposition onto substrates.

Fabrication of TiNi From Elemental Powders

TiNi sheets are commercially available from many suppliers, for example, Teledyne Wah Chang, Beaverton, Oreg., Memory Technologies, Brookfield, Conn., Raychem Corp., Palo Alto, Calif., among others. Commercially available TiNi has been produced either by vacuum induction melting or by vacuum arc remelting of pure metal ingots. It has been found, however, that commercially available TiNi has limited commercial applications because of difficulties of machining. Powder metallurgy techniques provide an alternative and preferred method for the fabrication of TiNi layer for the heterostructures of the present invention.

Nickel and titanium powders, 99.9% and 99.5% by composition pure respectively, and both having particles of about 44 µm average diameter, were combined in a ratio 50/50 atomic %. They were mixed by ball-milling, in a ceramic chamber, for either 4 or 24 h. The specimens were then compacted in a uniaxial die press under 27.5 MP for 5 minutes. The compacted specimens were 29 mm in diameter and typically 3.5 mm thick. The compacts were heat-treated in a $10^{-6}$ Torr vacuum tube furnace for varying times at temperatures ranging from 800° to 1000° C. Two heating rates were used: a slow heating rate of 5 K $min^{-1}$ and a faster heating rate of 10 K $min^{-1}$. In addition, one sample was placed in a furnace at 900° C. for one hour in flowing argon and one unmilled sample was pressed and sintered in vacuum at 900° C. for 6 hours.

The green and sintered densities were determined from weight and dimensional measurements. The surfaces of the specimens were ground and a Phillips PW 1729 diffractometer was used to determine the phases present. Some specimens were subsequently sectioned. The cross-sections were examined in an ISI-SX-30 scanning electron microscope (SEM) using backscattered electrons.

The alloy was an ordered intermetallic equiatomic compound. It had a high-temperature austenitic cubic B2 phase and a low-temperature martensitic B19' phase that was monoclinic. The TiNi (B19') and $Ti_2Ni$ phases were identified on the basis of both SEM and X-ray diffraction (XRD) analysis. The intermetallic phases all exhibit diffraction peaks, very close to each other. In particular, the $Ti_2Ni$ and B19' TiNi can be difficult to distinguish.

TiNi sheets prepared by powder metallurgy are significantly more porous than TiNi sheets manufactured by other methods. As a result TiNi prepared as above is more robust, less expensive and exhibits enhanced SME properties. The properties of TiNi as prepared herein are more specifically described by J. C. Hey and A. P. Jardine, in a scientific paper entitled "Shape Memory TiNi Synthesis from Elemental Powders", *Materials Science and Engineering*, 291–300, 1994, the content of which is incorporated herein by reference as if set forth in full.

Preparation of TiNi by Sputter Deposition

TiNi from a TiNi target was deposited onto 1" thick quartz substrates by using an advanced energy MDX-1K DC sputtering source at 100 watts for 1 hour at ambient temperature. The target to sample distance was controlled by positioning the sample via the linear sample translation rod. The sample to target distance varied from 8.5 to 26 cm long.

The thin films were initially amorphous and were annealed after deposition using a sample heater consisting of two 500 W halogen lamps. Sample annealings were conducted at 520° C. for 0.5 hour. After deposition and annealing, the sample was retracted through the vacuum load-lock and isolated from the chamber. Prior to PZT deposition the TiNi films obtained above did not receive any additional treatment.

The TiNi prepared via sputter deposition differed dramatically from the material made via powder metallurgy. Sputter deposited TiNi was demonstratedly a single phase material, smooth and continuous in profile. In contrast, the TiNi powder compacts showed evidence of the presence of additional intermetallic phases. The powder compacts were typically rather rough prior to polishing and had a significant amount of porosity in the microstructure, thereby providing a low density material. Due to the differences in processing, the sputter deposited TiNi was generally between 1 and 5 µm thickness, while the powder TiNi compacts were generally ⅛" or greater. The dramatic differences between these two materials caused by their geometry can be exploited in terms of their application. For example, thick TiNi powder compacts could be used for large area structural armor, whereas sputter deposited materials could be used for microballoon or small structure coatings.

Preparation of PZT/TiNi Films

Thin films of PZT obtained as above were coated onto SMA TiNi films by sol-gel and spin coating techniques.

The PZT sol was spun onto the TiNi substrates at 4000 rpm for 30 seconds and prebaked at 300° C. for 15 minutes to remove most of the organic material. This procedure was repeated 5 times to produce a film of approximately 0.28 µm thick. The thickness of the films was measured by a Rudolph Research Auto El II-NIR-3 ellipsometer using a refractive index of 2.4 for PZT.

The PZT films were crystallized to their ferroelectric perovskite phase by annealing at 600° C. for 5 minutes. The samples were annealed on a ceramic block and allowed to air cool on the same ceramic block. This provided a slower cooling rate as compared to cooling the sample alone in ambient air. It is believed that by lowering the cooling rate, the TiNi intermetallic substrate and the PZT ceramic film composite cooled isotopically thus preventing the occurrence of large strain mismatches resulting in cracking and delamination. The films were characterized by x-ray diffraction (XRD) techniques and optical microscopy. A Radiant Technologies RT-66A ferroelectric test system was used to obtain ferroelectric properties.

Figure 4:
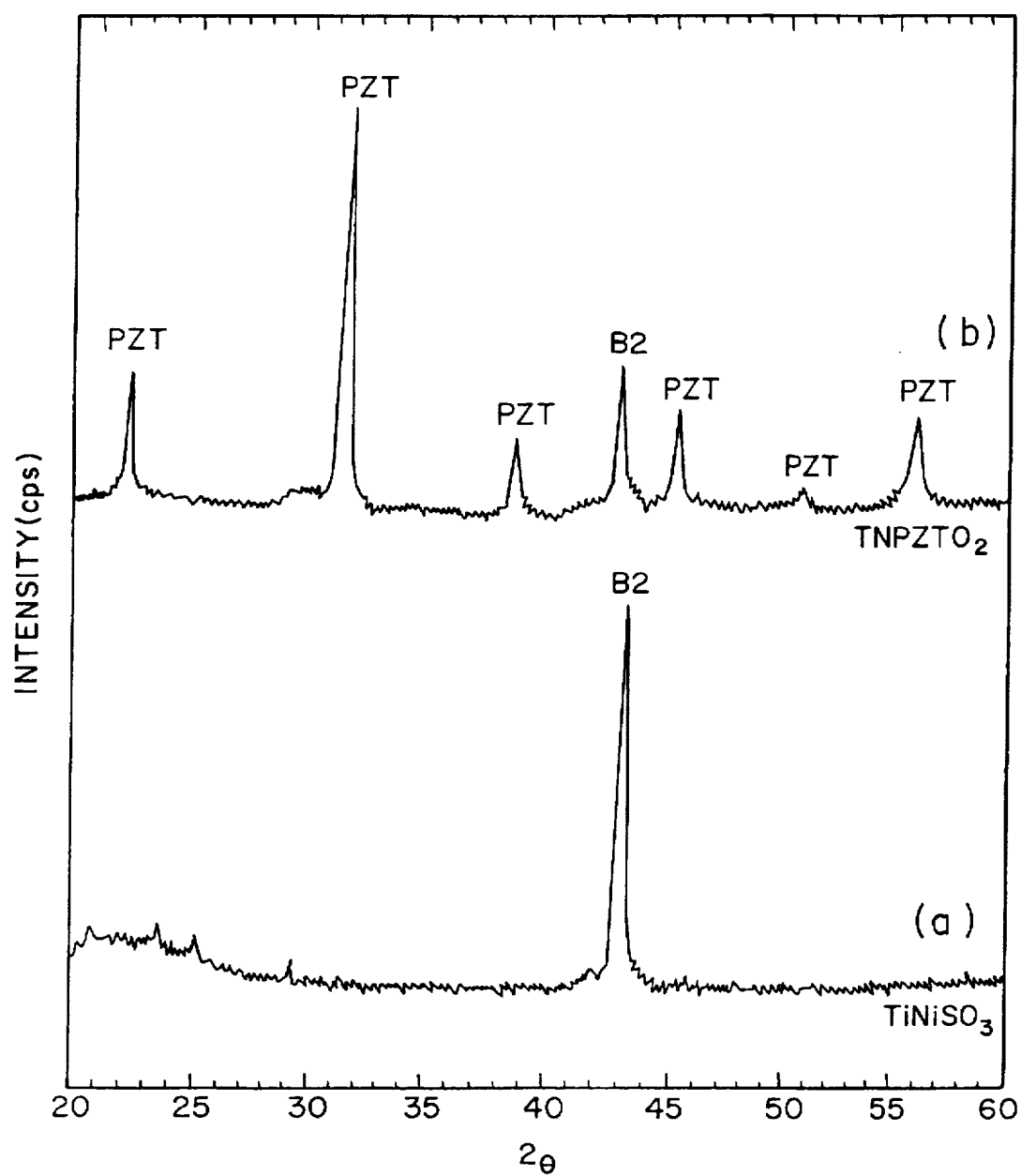
FIG. 4 illustrates X-ray defraction (XRD) results of a layer of ferroelectric material coupled to a layer of ferroelastic material (PZT/TiNi) heterostructure according to the present invention: (a) before any processing and (b) after annealing at 600° C. for 5 minutes showing the existence of TiNi (B2) and PZT (perovskite) phases and thus indicating minimal chemical interactions between two thin films which are part of the heterostructure of the present invention.

Room temperature XRD patterns of the TiNi thin films prior to and after PZT deposition are shown in FIGS. 4a and 4b.

The diffraction pattern for the TiNi/quartz substrate after in-situ annealing at 520° C. anneals is shown in FIG. 4a. The substrate was determined to be composed of superelastic austenite B2 phase of TiNi. Prior to PZT deposition the microstructure of TiNi was largely high temperature B2 phase, as shown in FIG. 4a.

After firing at 600° C. for 5 minutes, XRD analysis of PZT/TiNi showed the presence of the tetragonal perovskite phase of PZT as well as the B2 phase of TiNi as shown in FIG. 4b. No other peaks were observed, thus indicating that minimal chemical interactions took place between the two thin films. Of particular interest is the lack of any peaks associated with TiNi-air interactions. The Ti-air interaction at 600° C. is dramatic. Even very brief exposures of TiNi, i.e., 5 seconds to high temperature furnaces will generate large amounts of oxides. The lack of peaks associated with Ti—O system suggests that the amorphous sol-gel film strongly attracts oxygen to form the ferroelectric oxide, which deprives the TiNi substrate to oxygen exposure. Moreover, the densified ceramic may well act as a diffusion barrier to further oxygen attack of the underlying TiNi metal.

Figure 5:
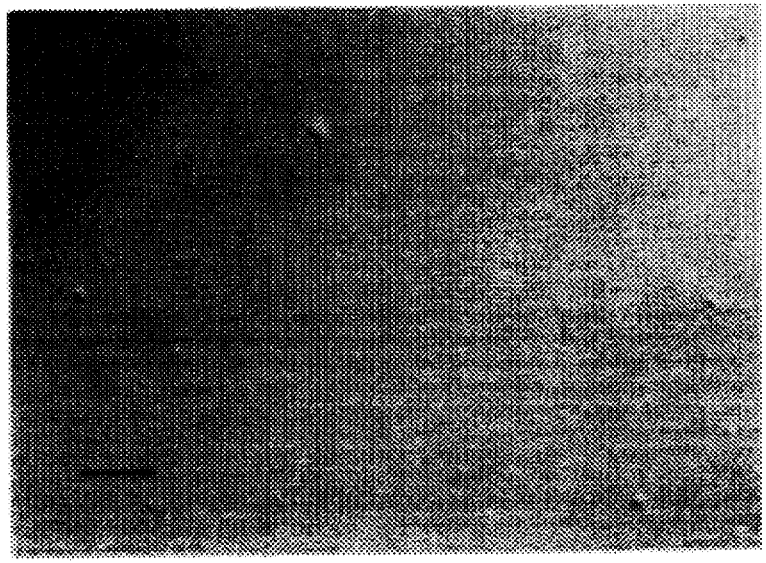
FIG. 5 is an optical micrograph of a film of ferroelastic material (TiNi) on a quartz substrate showing a smooth surface at 1000×magnification, marker=10 μm.

TiNi and PZT/TiNi film morphologies were characterized by optical microscopy. The sputtered TiNi films were optically smooth as shown in FIG. 5.

Figure 6A:
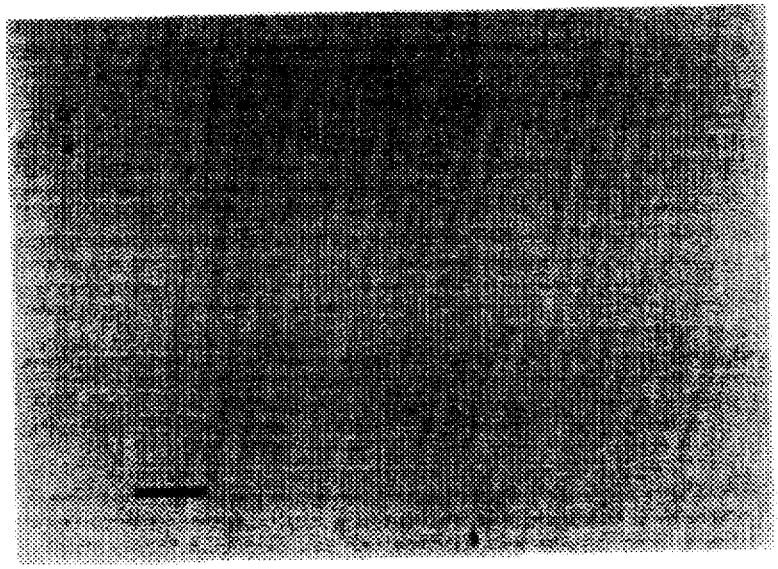
FIG. 6(a–b) illustrates optical micrographs of a ferroelectric film (PZT) on a ferroelastic film (TiNi/quartz substrate) showing a lack of cracks over large areas at: (a) 100× magnification, marker=100 μm and (b) 500×magnification, marker=50 μm.
Figure 6B:
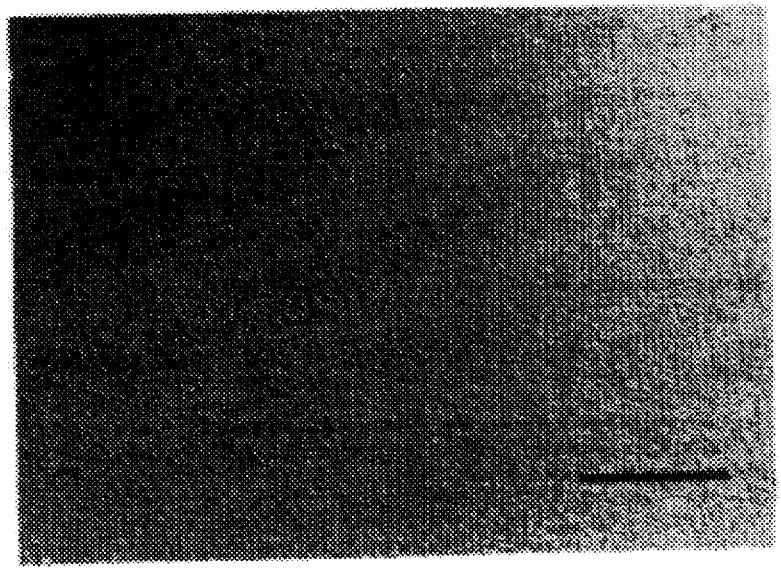

The PZT film on the TiNi had a fine grain structure and exhibited no cracks over large areas. Optical micrographs at low and high magnification are illustrated in FIGS. 6a and 6b, respectively. The lack of cracks is believed to be the result of subjecting the sample to a slow cooling rate. Compared to samples prepared with commercially obtained bulk TiNi substrates, the sputtered TiNi films were optically smooth. For PZT/TiNi films which were grown using sintered TiNi powder compacts, the PZT layer exhibited a very rough and cracked microstructure because the TiNi layer was either roughly ground or roughly polished. Similar results to sputter-deposited thin films were obtained when the TiNi surface was polished using 0.3 µm diamond paste, thereby generating a smooth surface on which to grow the films.

Figure 7:
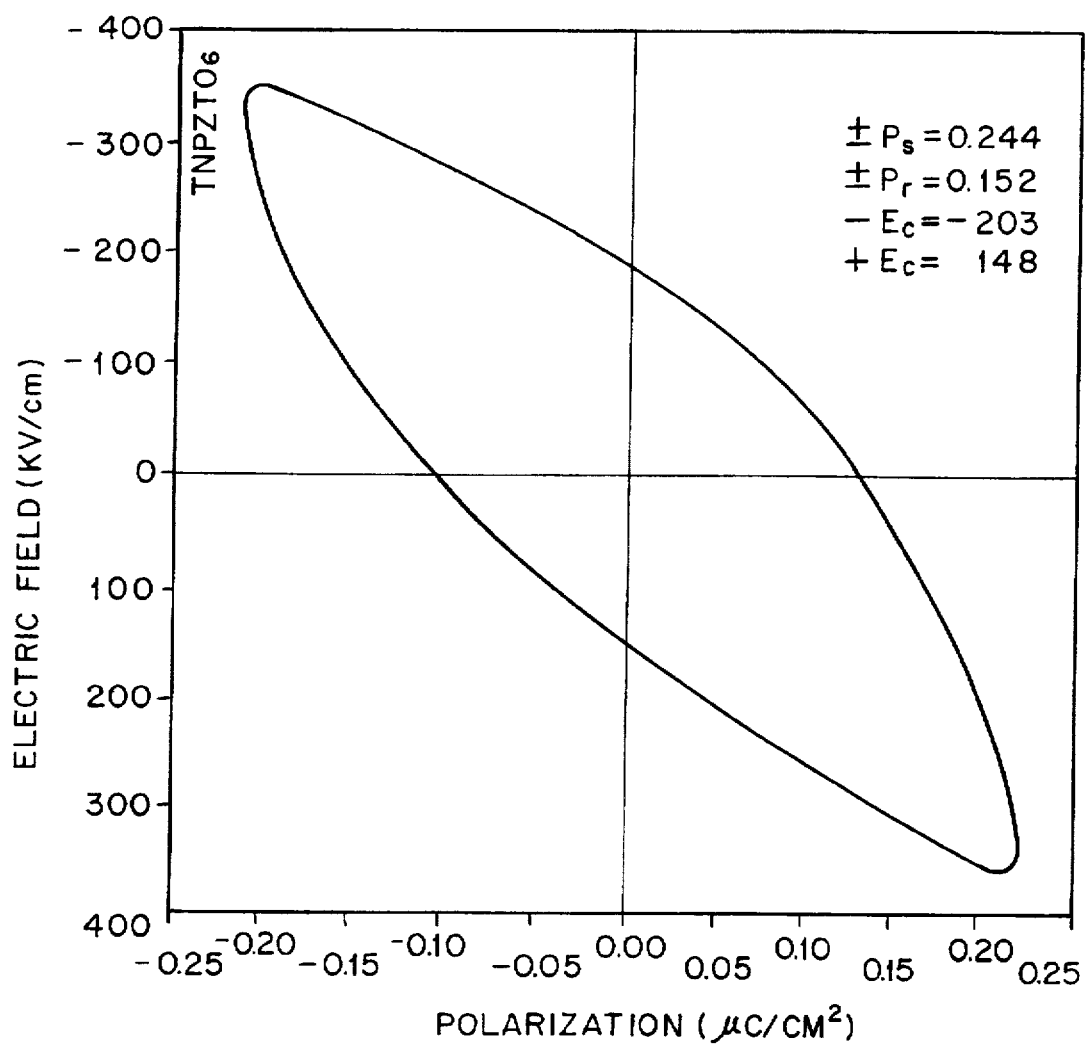
FIG. 7 is a hysteresis plot for 0.28 μm thick PZT film on TiNi at room temperature with a P$_r$=0.152 μC/cm$^2$ showing the ferroelectric properties of a ferroelastic/ferroelectric structure included in a damping device according to the present invention.

Ferroelectric properties were tested by using a RT-66A ferroelectric test system developed by Radiant Technologies. A 1.0 mm diameter electrode was deposited on top of the PZT film using silver paint and the TiNi substrate was used as the bottom electrode. The tests were conducted under room temperature conditions with an applied voltage of 10V. A remnant polarization value of 0.152 µC/cm$^2$ and coercive field of −203 and 116 kV/cm were obtained for a film which is 0.28 µm thick. The capacitance and resistance were measured to be 0.52 nF and 6.2×10$^{11}$ Ω-cm respectively. The hysteresis loop for the PZT/TiNi film as prepared above is illustrated in FIG. 7. Typical $P_r$, $P_s$ and $E_c$ values for PZT are 23–30 µ/cm$^2$, 45–50 µC/cm$^2$ and 40–45 kV/cm, respectively.

The tests conducted upon the PZT/TiNi films fabricated as described above indicate that PZT thin films with a Zr/Ti of 53/47 were successfully crystallized onto thin film SMA TiNi. XRD patterns showed that a crystalline tetragonal phase associated with ferroelectricity was present after firing at a temperature of 600° C. for 5 minutes. XRD results also showed minimal chemical interaction with the B2 TiNi substrate and the perovskite PZT ceramic after annealing cycles. The PZT on TiNi had high mechanical qualities, showing lack of crack defects and strong adhesion with no signs of delamination. As a result of poor top electrode material and adhesion, ferroelectric properties were poor as compared to literature values. However, polarization versus electric field plots revealed classical shape hysteresis loops, demonstrating ferroelectricity.

Preparation of TiO$_2$/PZT Layer

The PZT solution was then spun on top of the TiO$_2$ layer which was fired at 600° C. at 4000 rpm for 30 seconds and prebaked at 300° C. for 15 minutes. The process was repeated three times before the final annealing step. Several samples were prepared with varying annealing temperatures, 500°–700° C., for a constant time of 30 minutes. The samples were fired in an enclosed crucible that contained lead acetate powder to provide excess lead vapor and thereby prevent loss of lead frequently observed at high temperatures.

Preparation of TiO$_2$/PZT/TiNi Layer

The thin films of TiO$_2$/PZT obtained above were then coated onto SMA TiNi foils by sol-gel and spin coating techniques. The complex alkoxide solutions were prepared using lead acetate, titanium isopropoxide and zirconium n-propoxide stock metal organics dissolved in acetic acid and isopropanol and mechanically stirring for 15 minutes. Ethylene glycol was added in the amount of 0.3 ml to the resulting solution to minimize cracking during firing. The resulting solution was not hydrolyzed since it was observed that any addition of distilled water caused precipitates to form.

Preparation of TiNi/PZT/TiO$_2$/Buffer/PZT

After the TiO$_2$/PZT/TiNi structure has been prepared as above, it was then attached to a second thicker PZT layer by brazing or bonding. A buffer layer, including a layer of conductive silver-doped epoxy or conductive polyurethane was used to bond the thicker PZT plate to the TiO$_2$/PZT/TiNi structure. The buffer layer was used to increase the damping of the low frequency high amplitude vibrations. The buffer layer is optional, especially, in damping panels for small structures.

Thus, while there have been described what are presently believed to be the preferred embodiments of the present invention, those skilled in the art will realize that other and further modifications can be made without departing from the true spirit of the invention and it is intended to include all such modifications and variations as come within the scope of the claims as set forth below.

I claim:

1. A vibration damping device including at least a multilayer heterostructure which comprises:
   a layer of ferroelastic or Shape Memory Effect material for receipt of a vibration wave;
   a first layer of ferroelectric material coupled to said ferroelastic or Shape Memory Effect material; and
   a second layer of ferroelectric material coupled to said first layer of ferroelectric material with a layer of dielectric material therebetween.

2. The vibration damping device of claim 1, wherein said first layer of ferroelectric material is thinner than said second layer of ferroelectric material.

3. The vibration damping device of claim 1, wherein said layer of ferroelastic or Shape Memory Effect material is a compound selected from the group consisting of TiNi, AuCd, AgCd, InTl, Cu—Al—Zn alloy, Cu—Al—Ni alloy, TiAu, TiPt, TiNb, TiHf, $Fe_3Pt$, FeMnSi, FeMnTi and mixtures thereof.

4. The vibration damping device of claim 1, wherein said first and second layers of ferroelectric material are made from a compound selected from the group consisting of lead zirconate titanate, lanthanum zirconate titanate, barium titanate, strontium titanate, lead titanate, tungsten-bronze based ceramics, lithium niobate, lithium titanate based materials, potassium diphosphate, triglyceride sulfate, polyvinyldifluoride, and mixtures thereof.

5. The vibration damping device of claim 1, wherein said layer of dielectric material is an oxide selected from the group consisting of titanium oxide, aluminum oxide, NiO, PbO, $ZrO_2$, $SiO_2$, TiO, $Ti_3O_4$ and mixtures thereof.

6. The vibration damping device of claim 1, wherein said layer of dielectric material further comprises a buffer layer intermediate said layer of dielectric material and said second layer of ferroelectric material.

7. The vibration damping device of claim 6, wherein said buffer layer is a compound selected from the group consisting of titanium, aluminum, Nitinol and mixtures thereof.

8. The vibration damping device of claim 6, wherein said buffer layer is a compound selected from the group consisting of silver doped epoxy, conductive polyurethane and mixtures thereof.

9. The vibration damping device of claim 1, wherein said layer of ferroelastic material is covered by a thermoreflective barrier layer.

10. The vibration damping device of claim 9, wherein said thermoreflective barrier material is a compound selected from the group consisting of aluminum, nickel, copper, titanium, aluminized polyester, and mixtures thereof.

11. The vibration damping device of claim 1, wherein said layer of ferroelastic material has a thickness from about 1 µm to about 1000 mils, said first layer of ferroelectric material has a thickness of from about 0.5 µm to about 100 µm, said layer of dielectric material has a thickness from about 0.1 µm to about 10 µm, said second layer of ferroelectric material has a thickness from about 5 µm to about 1000 mils.

12. The vibration damping device of claim 6, wherein said buffer layer has a thickness from about 5µ to about 1000 mils.

13. The vibration damping device of claim 9, wherein said thermoreflective barrier layer has a thickness from about 50 nm to about 20µ.

14. An active and adaptive damping panel for mechanical and acoustic vibrations including at least a heterostructure which comprises:
   a layer of ferroelastic or Shape Memory Effect material for receipt of shock and sound waves;
   a first layer of ferroelectric material formed upon said layer of ferroelastic material; and
   a second layer of ferroelectric material formed upon said first layer of ferroelectric material with a capacitor therebetween.

15. A method of providing a vibration damping device which comprises the following step:
   coupling a ferroelastic or Shape Memory Effect material with a first and second layer of ferroelectric material having a capacitor therebetween.

16. The method of claim 15, wherein said first layer of ferroelectric material is thinner than said second layer of ferroelectric material.

17. The method of claim 15, wherein said layer of ferroelastic or Shape Memory Effect material is a compound selected from the group consisting of TiNi, AuCd, AgCd, InTl, Cu—Al—Zn alloy, Cu—Al—Ni alloy, TiAu, TiPt, TiNb, FeMnSi, FeMnTi, TiHf, $Fe_3Pt$, and mixtures thereof.

18. The method of claim 15, wherein said first and second layers of ferroelectric material are made from a compound selected from the group consisting of lead zirconate titanate, lanthanum zirconate titanate, barium titanate, strontium titanate, lead titanate, tungsten bronze based ceramics, lithium niobate, lithium tantalate based materials, potassium diphosphate, triglyceride sulfate, polyvinyl difluoride, and mixtures thereof.

19. The method of claim 15, wherein said capacitor is an oxide selected from the group consisting of titanium oxide, aluminum oxide, NiO, $SiO_2$, TiO, $Ti_3O_4$ PbO, $ZrO_2$, and mixtures thereof.

20. The method of claim 15, wherein said capacitor further comprises a buffer layer intermediate said capacitor and said second layer of ferroelectric materials.

21. The method of claim 20, wherein said buffer layer is a compound selected from the group consisting of titanium, aluminum, Nitinol, and mixtures thereof.

22. The method of claim 20, wherein said buffer layer is a compound selected from the group consisting of silver doped epoxy, conductive polyurethane and mixtures thereof.

23. The method of claim 15, wherein said layer of ferroelastic material is covered by a thermoreflective barrier layer.

24. The method of claim 23, wherein said thermoreflective barrier layer is a compound selected from the group consisting of aluminum, nickel, copper, titanium, aluminized polyester, and mixtures thereof.

25. The method of claim 15, wherein said layer of ferroelastic or Shape Memory Effect material has a thickness from about 1 µm to about 1000 mils, said first layer of ferroelectric material has a thickness from about 0.5 µm to about 10 µm, said layer of dielectric material has a thickness from about 0.1 µm to about 10 µm, said second layer of ferroelectric material has a thickness from about 5 µm to about 1000 mils.

26. The method of claim 20, wherein said buffer layer has a thickness from about 5µ to about 1000 mils.

27. The method of claim 23, wherein said thermoreflective barrier layer has a thickness from about 50 nm to about 20µ.

28. A vibration damping device including at least a multilayer heterostructure which comprises:
- a layer of ferroelastic or Shape Memory Effect material for receipt of a vibration wave;
- a first layer of ferroelectric material coupled to said ferroelastic or Shape Memory Effect material; and
- a second layer of ferroelectric material coupled to said first layer of ferroelectric material with a layer of dielectric material therebetween, wherein said layer of dielectric material further comprises a buffer layer intermediate said layer of dielectric material and said second layer of ferroelectric material, said buffer layer being a compound selected from the group consisting of silver doped epoxy, conductive polyurethane and mixtures thereof.

29. A vibration damping device including at least a multilayer heterostructure which comprises:
- a layer of ferroelastic or Shape Memory Effect material for receipt of a vibration wave;
- a first layer of ferroelectric material coupled to said ferroelastic or Shape Memory Effect material; and
- a second layer of ferroelectric material coupled to said first layer of ferroelectric material with a layer of dielectric material therebetween, wherein said layer of ferroelastic material is covered by a thermal reflective barrier layer.

30. The vibration damping device of claim 29, wherein said thermoreflective barrier layer has a thickness from about 50 nm to about 20μ.

31. A method of providing a vibration damping device which comprises the following steps:
- coupling of ferroelastic or Shape Memory Effect material with a first and second layer of ferroelectric material having a capacitor therebetween, wherein said capacitor further comprises a buffer layer intermediate said capacitor and said second layer of ferroelectric materials, said buffer layer is a compound selected from the group consisting of silver doped epoxy, conductive polyurethane and mixtures thereof.

32. A method of providing a vibration damping device which comprises the following step:
- coupling a ferroelastic or Shape Memory Effect material with the first and second layer of ferroelectric material having a capacitor therebetween, wherein said layer of ferroelastic material is covered by a thermoreflective barrier layer.

33. The method of claim 32, wherein said thermoreflective barrier layer is a compound selected from the group consisting of aluminum, nickel, copper, titanium, aluminized polyester, and mixtures thereof.

34. The method of claim 32, wherein said thermoreflective barrier layer has a thickness from about 50 nm to about 20μ.

* * * * *